(No Model.) 2 Sheets—Sheet 2.

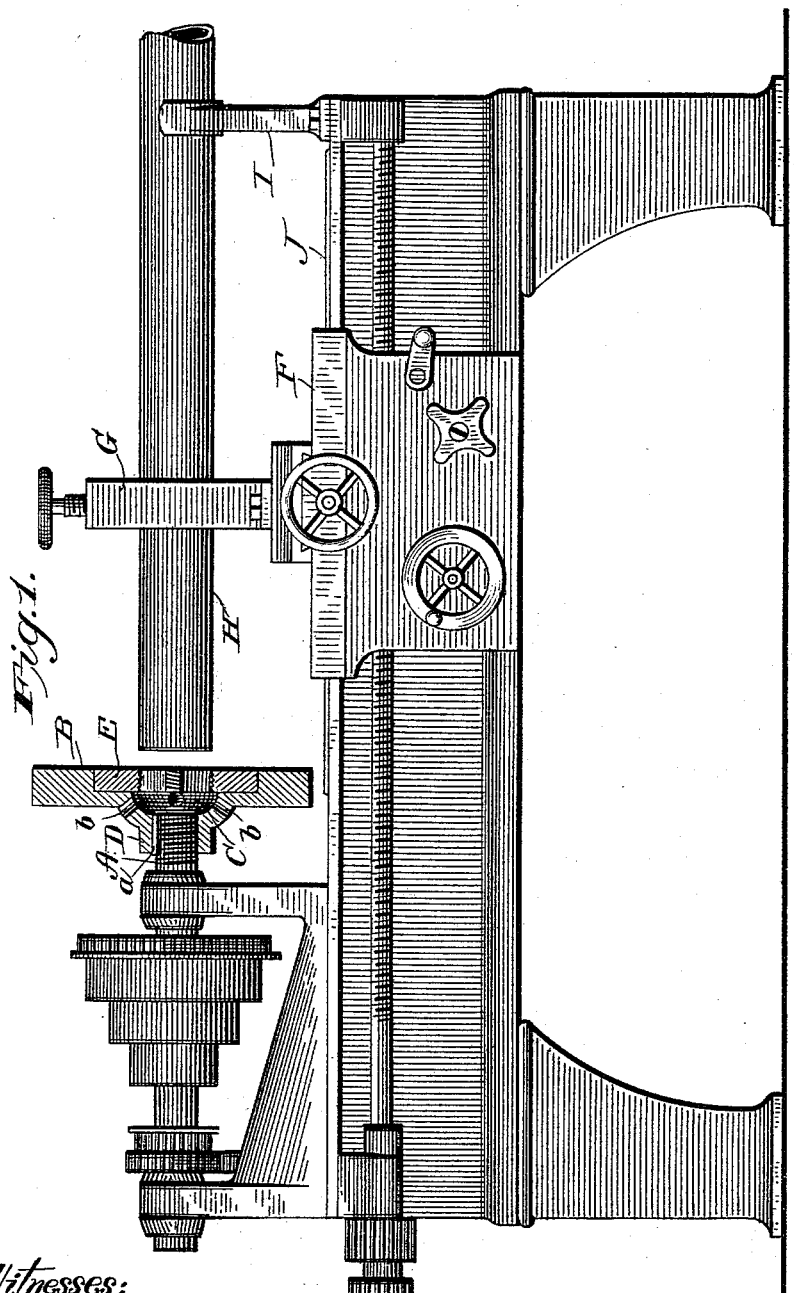

L. B. CURTIS.
PIPE AND BOLT THREADING ATTACHMENT FOR LATHES.

No. 439,122. Patented Oct. 28, 1890.

Witnesses:
J. S. Finch
Chas. H. Fleming

Inventor,
Lewis B. Curtis
By F. W. Smith
Atty.

UNITED STATES PATENT OFFICE.

LEWIS B. CURTIS, OF SOUTHPORT, ASSIGNOR TO CURTIS & CURTIS, OF BRIDGEPORT, CONNECTICUT.

PIPE AND BOLT THREADING ATTACHMENT FOR LATHES.

SPECIFICATION forming part of Letters Patent No. 439,122, dated October 28, 1890.

Application filed February 4, 1890. Serial No. 339,127. (No model.)

*To all whom it may concern:*

Be it known that I, LEWIS B. CURTIS, a citizen of the United States, residing at Southport, in the county of Fairfield and State of Connecticut, have invented certain new and useful Improvements in Pipe and Bolt Threading Attachments for Lathes; and I do hereby declare the following to be a full, clear, and exact description of the invention, such as will enable others skilled in the art to which it appertains to make and use the same.

My invention has reference to a certain new and useful improvement in screw-cutting attachments for lathes, and has for its object to provide a device of this description which may be attached after the manner of an ordinary chuck, and which supplies the requirement of an economical and handy tool for constant use.

It is an every-day occurrence in a shop for a workman to have frequent use for a pipe-threading machine, and there is therefore considerable demand for the latter; but as such machines are expensive it is not often that more than one or two of them are found in an ordinary tool-room of a shop. The pipe-threading machine belongs in the class of special machinery, and is not looked upon as a necessary fixture in a shop, as are planing, shaping, and milling machines, presses, lathes, &c. Therefore in this present invention I have supplied the want of a machine for threading pipe, bolts, &c., by a simple device which may readily be attached to or detached from the ordinary lathe-spindle, after the manner of a chuck.

Figure 3:
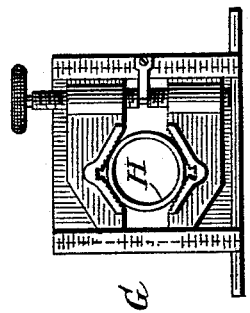
Figure 2:
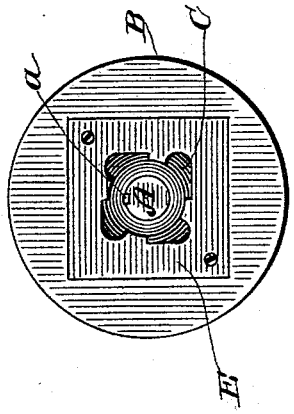

In the accompanying drawings, Figure 1 shows an elevation of a lathe with my improvement in sectional elevation attached thereto; Fig. 2 a detail face view of my improvement, and Fig. 3 a detail elevation showing the vise for clamping the pipe or bolt.

Similar letters denote like parts in the several figures.

My invention does not pertain to any of the operative parts of a lathe, and therefore I will not describe the latter, but will merely refer to the lathe spindle and carriage, which parts have immediate relation with my invention.

A is the threaded lathe-spindle, to which the usual chuck attachment is secured.

B is the die-carrying head, which is recessed, as seen at C, and is provided at the rear with a hollow interiorly-threaded hub D. The hub is screwed onto said spindle, and is secured thereto as against rotation by a key $a$, in the usual manner.

E is the die-plate secured within the face of the head B, as shown at Fig. 2.

$b$ are small oil-holes through the hub and leading into the recess C, whereby the latter may be filled with oil to facilitate the threading of the pipe or bolt.

Mounted on the lathe-carriage F is a vise G, within which the pipe H is clamped preparatory to threading.

I is an auxiliary support for the pipe, and rises from any suitable part of the lathe-bed J.

The operation of my improvement is as follows: The carriage is advanced toward the head B until the threading-dies have engaged with the pipe, when the continued operation of said dies will of itself draw the carriage to feed the pipe. When the required depth of thread has been cut, the workman throws back the usual belt-shifter, thus reversing the movement of the head, whereby the latter is run off from the threaded pipe or rod. The head may be provided with the usual separable dies, if desired, and the latter may be simply distended after the threading-operation, thus permitting the pipe or bolt to be withdrawn without reversing the rotary movement of the head. My invention, however, has nothing to do with any particular construction of dies, but resides in the idea of a detachable die-carrying head adapted for ready attachment to the lathe-spindle, and I contemplate only the adaptation of my invention as a lathe attachment.

Having thus described my invention, what I claim as new, and desire to secure by Letters Patent, is—

In a lathe attachment, the combination of the head B, the threading-dies secured therein, said head having a recess C immediately behind said dies, and oil-perforations $b$, leading into said recess, the hub D, extended rearwardly from said head and threaded interiorly, and the threaded lathe-spindle, substantially as shown and set forth.

In testimony whereof I affix my signature in presence of two witnesses.

LEWIS B. CURTIS.

Witnesses:
J. P. FINCH,
F. W. SMITH, Jr.